United States Patent [19]

Oishi et al.

[11] 4,101,096

[45] Jul. 18, 1978

[54] MAGNETIC TAPE CASSETTE

[75] Inventors: Kengo Oishi; Osamu Suzuki, both of Odawara, Japan

[73] Assignee: Fuji Photo Film Co., Ltd., Minami Ashigara, Japan

[21] Appl. No.: 723,369

[22] Filed: Sep. 15, 1976

[30] Foreign Application Priority Data

Sep. 17, 1975 [JP] Japan ................. 50-112451

[51] Int. Cl.² ............... G03B 1/04; G11B 15/32; G11B 23/04
[52] U.S. Cl. ................................. 242/199
[58] Field of Search ........... 242/74, 76, 197–200; 360/96, 132

[56] References Cited

U.S. PATENT DOCUMENTS

| 3,556,433 | 1/1971 | Abitboul | 242/199 |
|---|---|---|---|
| 3,556,434 | 1/1971 | Koeppe | 242/199 |
| 3,606,203 | 9/1971 | Akashi et al. | 242/199 |
| 3,712,559 | 1/1973 | Schwartz | 242/199 |
| 3,791,608 | 2/1974 | Akashi et al. | 242/199 |
| 3,826,489 | 7/1974 | Watkins, Jr. | 360/132 |

FOREIGN PATENT DOCUMENTS 2,501,914  8/1975  Fed. Rep. of Germany ....... 242/199

Primary Examiner—Leonard D. Christian
Attorney, Agent, or Firm—Sughrue, Rothwell, Mion, Zinn and Macpeak

[57] ABSTRACT

A magnetic tape cassette including a cushion sheet so embossed and convexly curved that the sheet may bear against edge portions of a magnetic tape in order to avoid an occurrence of breakage or creases in the edge portions and to correct displacement thereof in the direction of the width of the tape.

7 Claims, 7 Drawing Figures

MAGNETIC TAPE CASSETTE

BACKGROUND OF THE INVENTION

1. Field of the Invention

The present invention relates to a magnetic tape cassette and more particularly to a magnetic tape cassette having means for preventing tape displacement on the reels in the direction of the width of the tape.

2. Description of the Prior Art

Recently, it has been proposed to provide miniaturized light-weight cassette tape recorders and miniaturized magnetic tape cassettes for use therewith. Further, it is highly desirable to provide such magnetic tape received within the cassette of this type having high density recording and reproduction for a long period of time. In order to satisfy the latter requirements, tapes such as the so-called C-120, C-180 tapes have been designed. Moreover, to achieve high density recording, the surface of the recording medium must be treated so as to have a mirror face finish.

In a well-known guide mechanism for guiding a cassette tape, such as is shown in FIG. 1, if the coefficient of sliding friction between layers of a recording surface of tape and a backing material is large, such as more than 0.4, or if a layer of air is between the tape layers and cannot be removed, the tape becomes curled up dishwise or stepwise, causing the tape to loop or jam as well as becoming deformed, and in the worst case, causing a stop of tape travel. This tendency is more marked as the speed of the tape increases at which tape is quickly fed or unreeled.

As shown in FIG. 1, a well-known tape travel guide mechanism for a cassette tape comprises a pair of reels 2 and 3 encased in a hollow case 1 formed by fixing an upper case 1a and a lower case 1b by means of fixing members 1c. The cassette includes a fixed guide pin 4, a rotary guide roller 5, a pressing pad 6, a rotary guide roller 7, a fixed guide pin 8, and flat guide plates 9 (only one shown in FIG. 1) disposed between the inner sides of said upper case 1a and lower case 1b and the opposite sides of said reels 2 and 3.

Tape T, wound on the reel 2, is fed to the reel 3 orderly passing through the fixed guide pin 4, rotary guide roller 5, pressing pad 6 for urging tape T against a recording and reproducing head, rotary guide roller 7, and fixed guide pin 8, in such a manner that the opposite edges of the tape are guided by the respective guide plates 9 without being greatly displaced in the width direction of the tape.

However, the prior art cassette poses a drawback such that when the tape quickly wound in one direction and then the other direction, the edge portions of the tape on the reel 2 or 3 are greatly displaced in the width direction so that the edges strongly hit almost the entire area of the inner wall surface of the guide plate 9 thereby increasing the feed-out back tension magnitude by two or three times. As a consequence breakage or creases, which remain as a permanent strain, tend to occur near the edges and a signal recorded on the edge track becomes abnormal, rendering faithful reproduction impossible.

SUMMARY OF THE INVENTION

The present invention overcomes the disadvantages noted above with respect to prior art cassettes by providing a magnetic tape cassette which can unreel and reel a magnetic tape while properly positioning both the edge portions of the magnetic tape.

The above object of the invention may be achieved by a magnetic tape cassette provided with a cushion sheet embossed so that the latter may bear at a desired pressure against edge portions of a magnetic tape reeled on a reel.

Preferred embodiments of a cassette according to the present invention will now be described by reference to the accompanying drawings.

DESCRIPTION OF THE PREFERRED EMBODIMENTS

Figure 1:
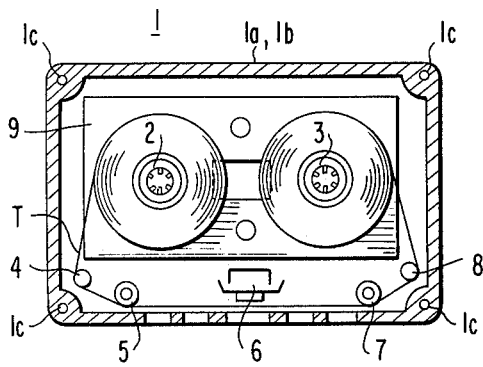
FIG. 1 is a transverse sectional view of a conventional cassette.
Figure 2:
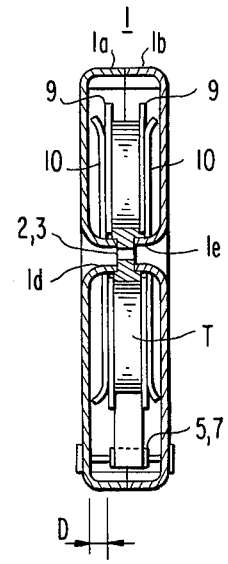
FIG. 2 is a longitudinal sectional view showing a preferred embodiment of a cassette according to the present invention.

Referring now to FIG. 2, which is a longitudinal sectional view showing a preferred embodiment of a cassette according to the present invention, there is shown a structure thereof analogous to that of the conventional cassette shown in FIG. 1 except for a cushion sheet 10 to which embossing is applied.

The cassette of the present invention comprises a pair of reels 2 and 3 encased in a hollow case 1 formed by fixing an upper case 1a and a lower case 1b by means of fixing members 1c, a fixed guide pin 4, a rotary guide roller 5, a pressing pad 6, a rotary guide roller 7, and a fixed guide pin 8. Guide plates 9, which are flat and movable in the width direction of tape T, are disposed between the inner sides of said upper case 1a and lower case 1b and the opposite sides of said reels 2 and 3. Cushion sheets 10, applied with embossing, are disposed between each of said guide plates 9 and said upper and lower cases 1a, 1b, respectively.

Figure 3:
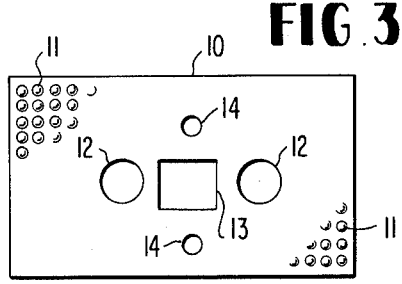
FIGS. 3 to 6 are plan views of a cushion sheet used for the cassette of the invention, FIG. 4 being an enlarged sectional view of the cushion sheet shown in FIGS. 3 and 6.
Figure 4:
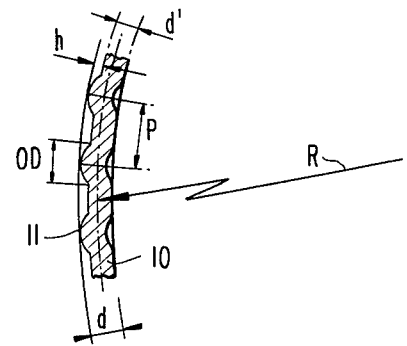

As may be seen in FIGS. 3 and 4, the cushion sheet 10 is embossed so as to form a number of tiny semispherical projections 11 on one surface thereof, the entire sheet being bent convexly in the projecting direction of projections 11 with a uniform radius of curvature R as shown in FIG. 4, due to strains resulting from embossing. The cushion sheet preferably is a plastic sheet having a thickness $d'$ of from $50\mu$ to $150\mu$, of which apparent full thickness $d$ is held not greater than a spacing D between the guide plate 9 and the upper case 1a or lower case 1b. The cushion sheet may be made from, for example, polyethylene, teflon, styrene, polypropylene, vinyl chloride, vinyl acetate, polyethylene terephthalate, fiber triacetate, or synthetic paper, etc.

The projections 11 preferably have a projected maximum overall diameter OD in the range of from 1 mm to 10 mm, a projected height $h$ in the range of from $5\mu$ to $20\mu$, and a spacing or pitch P in the range of from 1 mm to 10 mm. The preferred range within the latter broader ranges are; projected maximum OD between 2 mm and 5 mm, projected height $h$ between $7\mu$ and $15\mu$, and spacing P between 2 mm and 5 mm.

The cushion sheet 10, which is entirely applied with embossing as previously described, is formed with round holes 12 through which are extended ring-like support members 1d and 1e for rotatably supporting the reels 2 and 3, respectively, a tape viewing window opening 13, and small holes 14 for fixing the upper and lower cases 2 and 3, respectively. The sheet is cut into a rectangle which is equal to or slightly smaller than the guide plate 9, after which the sheet with its surface provided with projections 11 opposed to the guide plate 9 is inserted in a spacing D between the guide plate 9 and the upper case 1a and lower case 1b.

The cassette operates as follows.

Tape T, which is fed from a reel 2 to a reel 3 orderly passing through a fixed guide pin 4, a rotary guide roller 5, a pressing pad 6, a rotary guide roller 7, and a fixed guide pin 8, is unreeled and reeled in a condition where opposite edge portions thereof are subjected to a pressing force of the cushion sheet 10 through the guide plate 9. The cushioning characteristic results from the individual projections 11 formed by embossing, and the curved configuration of the entire sheet, curved with a uniform radius of curvature R.

While the aforementioned pressing force can properly be determined in consideration of rigidity, tension, travelling speeds and the like of the tape T, it may usually be set in the range of from 0.4 to 0.8 mg/mm$^2$ with respect to the entire width of tape to provide a back tension of 10 – 20 g.

Consequently, a relatively slight displacement of tape edge portions in the width direction of tape, which easily occurs in an operation of quick feed or quick unreeling of the tape, may readily be controlled by an initial pressing force imparted to the tape edge portions through the guide plate 9, whereby the tape is pushed back to its normal position.

On the other hand, when the oppositely directed pressing forces on the tape edges reach a balance, displacing of the tape edge portions in the width direction of tape ceases.

Because of the elasticity and cushion characteristic of the cushion sheet 10 properly determined in consideration of rigidity, tension and travelling speed of the tape T, moving energy of the tape edge portions in the width direction of the tape is absorbed slowly but positively and in addition, the returning energy directed toward the normal position is imparted thereto slowly but positively to thereby avoid an occurrence of breakage or creases induced as a result of impetuous correction of displacement in the tape edge portions.

Figures 5, 6:
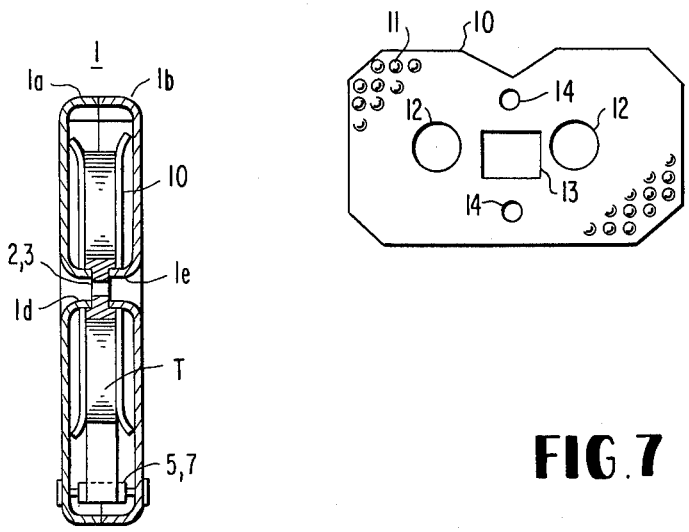
Figure 7:
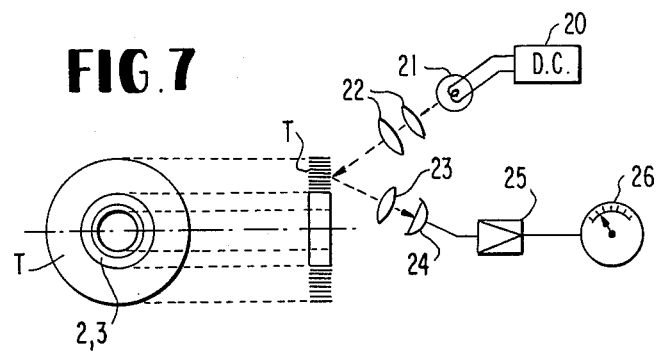
FIG. 7 is a conceptual view of a device for measuring a condition of an end on which tape is wound.

In FIG. 5 there is shown an alternative embodiment of the present invention, which is characterized in that the cushion sheet 10 is disposed between inner sides of the upper case 1a and lower case 1b and sides of the reels 2 and 3 in such a manner that surfaces of projections 11 may directly bear against the tape edge portions without provision of the aforementioned guide plate 9.

In this case, preferably, the cushion sheet 10 is designed to prevent charging by mixing a carbon powder therein, and further, graphite, talc powder, molybdenum bisulfide, tungsten bisulfide, calcium carbonate and the like are added therein to lower the coefficient of friction, thereby enhancing its wearability.

It should further be noted that the cushion sheet 10 is not limited to a rectangle in its contour but a polygon as shown in FIG. 6 or ellipse may also be used as long as it has a wide enough area to cover the entire area of the reeled end of tape T reeled on the reels 2 and 3 with a maximum diameter of reeling. Also, the projections 11 formed in the cushion sheet 10 are not limited in shape to semi-sphere as previously mentioned, but a pyramid may also be used.

If the cushion sheet 10 is disposed between the inner sides of the upper case 1a and lower case 1b and the sides of the reels 2 and 3, respectively, in such a manner that surfaces of projections 11 may directly bear against the tape edge portions without provision of the guide plate 9, the contact area which bears against the tape edge portions is reduced considerably compared to that of the aforesaid flat guide plate 9. This can materially reduce the back tension of the tape T with a resulting decrease in the occurrence of breakage or creases, which remain as a permanent strain when correction of displacement in the tape edge portions is made. Obviously, in reels 2, 3 having a flange member disposed on one side thereof, the cushion sheet 10 is merely required in engagement with only the tape edge portions of a tape provided with no flange member, and even in a cassette composed of a single reel, the aforementioned cushion sheet 10 may readily be applied thereto.

The cassette of the present invention described above affords novel effects as follows:

(1) The moving energy of the tape edge portions in the width direction of the tape is absorbed slowly but positively by the cushion sheet 10, after which returning energy direct toward the normal position may be imparted slowly but positively to the tape edge portion. As a consequence, displacement of the tape edge portions in the width direction of the tape may be corrected without occurrence of breakage or creases, which remain as a permanent strain in the tape edge portions.

(2) In the case where the projections 11 come into direct contact with the tape edges, the contract area with the tape is considerably reduced, thereby reducing friction, and tape back tension, which is one cause of breakage and creases in the tape edge portions.

(3) Because of the effects noted above in (1) and (2) above, the ends of tape reeled on the reels 2 and 3 may orderly be aligned, and the instability of reproduction output caused by the breakage or creases in the tape edge portions may be overcome.

While the invention has been described in detail and with reference to specific embodiments thereof, it will be apparent to one skilled in the art that various changes and modifications can be made therein without departing from the spirit and scope thereof.

What is claimed is:

1. In a magnetic tape cassette unit of the type having at least one reel therein for reeling and unreeling a magnetic tape thereon, said reel being disposed in a housing having an upper wall and a lower wall confining said tape, the improvement comprising a plurality of elastically tensioned sheets, each having embossed projections projecting from a surface thereof, said projections positioned on said surface to press the tape edges along an axis parallel to the axis of said reel to maintain said tape in preferred position in the width direction thereof, said sheets being curved at a radius of curvature to elastically urge said projections against said tape edges, and wherein: said sheets each having a thickness in the range of 50 $\mu$ to 150 $\mu$ and said embossed projections have an overall diameter in the range of 1mm to 10mm, a projection height in the range of 5 $\mu$ to 20 $\mu$ and a pitch in the range of 1mm to 10mm.

2. A magnetic tape cassette unit as claimed in claim 1 wherein said plurality of sheets comprises a first sheet positioned in the space between the tape edge when reeled on said reel and the upper wall of said housing, and a second sheet positioned in the space between the opposite tape edge when reeled on said reel and the lower wall.

3. A magnetic tape cassette unit as claimed in claim 2 wherein each said sheet is formed of a plastic material and said overall radius of curvature is large enough to cause the said sheet to press between its respective wall and a tape edge.

4. A magnetic tape cassette unit as claimed in claim 3 wherein said embossed projections are disposed across said entire surface and face said tape edges in direct contact therewith.

5. A magnetic tape cassette unit as claimed in claim 3 wherein said embossed projections face said tape edges, and further comprising a pair of smooth plates positioned between said projections and said tape edges, respectively.

6. A magnetic tape cassette unit as claimed in claim 1 wherein said embossed projections have dimensions in the inclusive ranges as follows:
    (a) projection overall diameter - 2 mm to 5 mm;
    (b) projection height - 7 $\mu$ to 15 $\mu$;
    (c) pitch - 2 mm to 5 mm.

7. A magnetic tape cassette unit as claimed in claim 3 wherein each said sheet is made from a material selected from the group consisting of, polyethylene, teflon, styrene, polypropylene vinyl chloride, vinyl acetate, polyethylene terephthalate, fiber triacetate, or synthetic paper.

* * * * *